United States Patent
Vilermo et al.

(10) Patent No.: US 10,623,879 B2
(45) Date of Patent: Apr. 14, 2020

(54) METHOD OF EDITING AUDIO SIGNALS USING SEPARATED OBJECTS AND ASSOCIATED APPARATUS

(71) Applicant: Nokia Technologies Oy, Espoo (FI)

(72) Inventors: Miikka Tapani Vilermo, Siuro (FI); Arto Juhani Lehtiniemi, Lempaala (FI); Lasse Juhani Laaksonen, Tampere (FI); Mikko Tapio Tammi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/400,130

(22) Filed: May 1, 2019

(65) Prior Publication Data

US 2019/0261121 A1  Aug. 22, 2019

Related U.S. Application Data

(63) Continuation of application No. 15/283,681, filed on Oct. 3, 2016, now Pat. No. 10,349,196.

(51) Int. Cl.
*H04S 3/00* (2006.01)
*H04H 60/04* (2008.01)
(Continued)

(52) U.S. Cl.
CPC .......... *H04S 3/008* (2013.01); *G11B 27/031* (2013.01); *H04H 60/04* (2013.01); *H04H 60/73* (2013.01);
(Continued)

(58) Field of Classification Search
CPC .......... G06F 3/16; G06F 17/00; G06F 17/30; G10H 1/00; G10H 2210/105; G10H 2210/131; G10L 19/00; G10L 19/02; G11B 27/031; H03G 5/00; H03G 7/00; H04H 60/04; H04H 60/73; H04R 3/00; H04S 3/00; H04S 3/008; H04S 2400/11
USPC .......... 84/603, 604, 610, 611, 734; 89/1.51; 340/407.2; 345/156, 440; 360/72.2; 365/200; 369/1, 47.15, 47.55, 53.21, 84;
(Continued)

(56) References Cited

U.S. PATENT DOCUMENTS 3,797,037 A  3/1974  Kolpek .......................... 360/13
6,490,359 B1  12/2002  Gibson ......................... 381/119
(Continued)

FOREIGN PATENT DOCUMENTS

GB  2533654 A  6/2016
WO  WO-2007/040791 A1  4/2007
(Continued)

OTHER PUBLICATIONS

Sylvain, Marchand, et al., "Dream: a Novel System for Joint Source Separation and Multitrack Coding", Audio Engineering Society, http://www.aes.org/e-lib/browse.cfm?elib=16479; Oct. 25, 2012, 1 pg.
(Continued)

*Primary Examiner* — Gerald Gauthier
(74) *Attorney, Agent, or Firm* — Harrington & Smith

(57) ABSTRACT

A method comprises providing an audio file comprising two or more discrete tracks; separating the two or more discrete tracks; setting a limit on an amount at least one of the two or more discrete tracks may be altered; and outputting the separated and limited discrete tracks as a file for use by an end user.

18 Claims, 8 Drawing Sheets

(51) Int. Cl.
*G11B 27/031* (2006.01)
*H04H 60/73* (2008.01)

(52) U.S. Cl.
CPC . *G10H 2210/105* (2013.01); *G10H 2210/131* (2013.01); *H04S 2400/11* (2013.01)

(58) Field of Classification Search
USPC ............. 379/202.01; 381/2, 20, 22, 119; 386/227, 235, 290, 327; 463/35; 700/94; 703/8; 704/1, 9, 205, 258, 500; 705/7.34; 709/227; 715/716, 769; 725/18, 28, 143
See application file for complete search history.

(56) References Cited

U.S. PATENT DOCUMENTS

| | | | |
|---|---|---|---|
| 6,560,577 B1 | 5/2003 | Gilbert | 369/85 |
| 7,157,638 B1 | 1/2007 | Sitrick | 84/477 R |
| 7,158,456 B2 | 1/2007 | Han | 369/47.15 |
| 7,450,705 B1 | 11/2008 | Cohen | 370/250 |
| 7,605,320 B2 | 10/2009 | Le | 84/464 R |
| 7,689,394 B2 | 3/2010 | Furem | 703/8 |
| 7,912,566 B2 | 3/2011 | Lee | 700/94 |
| 7,935,881 B2 | 5/2011 | Aimi | 84/104 |
| 7,960,638 B2 | 6/2011 | Miyajima | 84/600 |
| 8,019,449 B2 | 9/2011 | Barzegar | 700/94 |
| 8,085,269 B1 | 12/2011 | Classen | 345/440 |
| 8,170,884 B2 | 5/2012 | Vaudrey et al. | 764/500 |
| 8,173,883 B2 | 5/2012 | Willacy et al. | 84/600 |
| 8,290,769 B2 | 10/2012 | Taub et al. | 704/207 |
| 8,315,396 B2 | 11/2012 | Schreiner et al. | 381/22 |
| 8,541,676 B1 | 9/2013 | Waldman | 84/603 |
| 8,939,056 B1 | 1/2015 | Neal, III | 89/1.51 |
| 9,024,166 B2 | 5/2015 | Ramos | 726/26 |
| 9,076,264 B1 | 7/2015 | Gillespie et al. | 345/440 |
| 9,293,127 B2 | 3/2016 | Serletic | 700/94 |
| 9,294,862 B2 | 3/2016 | Kim | |
| 9,310,959 B2 | 4/2016 | Serletic, II et al. | 700/94 |
| 9,319,821 B2 | 4/2016 | Arrasvuori et al. | 381/17 |
| 9,330,720 B2 | 5/2016 | Lee | |
| 9,787,816 B2* | 10/2017 | Kim | H04N 21/41407 |
| 10,002,596 B2 | 6/2018 | Vilermo | |
| 2002/0051407 A1 | 5/2002 | Griner | 369/1 |
| 2003/0009247 A1* | 1/2003 | Wiser | G11B 20/10527 700/94 |
| 2003/0023421 A1 | 1/2003 | Finn | 704/1 |
| 2003/0086341 A1 | 5/2003 | Wells et al. | 369/13.56 |
| 2003/0091204 A1 | 5/2003 | Gibson | 381/119 |
| 2003/0165328 A1 | 9/2003 | Grecia | 386/290 |
| 2004/0111171 A1 | 6/2004 | Jang | 700/94 |
| 2005/0268323 A1 | 12/2005 | Yamaguchi | 725/143 |
| 2006/0028951 A1 | 2/2006 | Tozun | 369/84 |
| 2006/0075422 A1 | 4/2006 | Choi | 725/18 |
| 2006/0129842 A1 | 6/2006 | Herberger et al. | |
| 2006/0209652 A1 | 9/2006 | Toms | 369/47.55 |
| 2007/0133811 A1 | 6/2007 | Hashimoto | 381/22 |
| 2007/0198551 A1 | 8/2007 | Barnes et al. | 707/100 |
| 2009/0012779 A1 | 1/2009 | Ikeda | 704/205 |
| 2009/0052290 A1 | 2/2009 | Tanaka | 369/53.21 |
| 2009/0106429 A1 | 4/2009 | Siegal | 709/227 |
| 2009/0147961 A1 | 6/2009 | Lee | 381/2 |
| 2009/0235300 A1 | 9/2009 | Hayashi | 725/28 |
| 2009/0306973 A1 | 12/2009 | Hiekata | 704/205 |
| 2010/0076577 A1 | 3/2010 | Lee | 700/94 |
| 2010/0280638 A1 | 11/2010 | Matsuda | 700/94 |
| 2010/0303262 A1 | 12/2010 | Okabayashi | 381/119 |
| 2011/0046759 A1 | 2/2011 | Kim | 700/94 |
| 2011/0111850 A1 | 5/2011 | Beerhorst | 463/35 |
| 2012/0101608 A1 | 4/2012 | Jang | 700/94 |
| 2012/0151400 A1* | 6/2012 | Hong | G06F 3/04817 715/769 |
| 2012/0232681 A1 | 9/2012 | Mundy | 700/94 |
| 2013/0138232 A1 | 5/2013 | Kim | 700/94 |
| 2013/0170651 A1 | 7/2013 | Lee | 381/20 |
| 2014/0041511 A1 | 2/2014 | Kaipainen | 84/465 |
| 2014/0053711 A1 | 2/2014 | Serletic, II | 84/611 |
| 2014/0115468 A1 | 4/2014 | Guerrero | 715/716 |
| 2014/0133683 A1* | 5/2014 | Robinson | H04R 5/02 381/303 |
| 2014/0140536 A1 | 5/2014 | Serletic, II et al. | |
| 2014/0248036 A1 | 9/2014 | Saari et al. | 386/248 |
| 2014/0254831 A1 | 9/2014 | Patton | 381/107 |
| 2014/0288685 A1 | 9/2014 | Haefeli | 700/94 |
| 2014/0348342 A1 | 11/2014 | Laaksonen et al. | 381/92 |
| 2014/0355789 A1 | 12/2014 | Bohrarper et al. | 381/119 |
| 2015/0016641 A1 | 1/2015 | Ugur et al. | 381/303 |
| 2015/0066481 A1 | 3/2015 | Terrell | 704/9 |
| 2015/0130706 A1* | 5/2015 | Lacroix | A63F 13/23 345/156 |
| 2015/0139426 A1 | 5/2015 | Tammi et al. | |
| 2015/0242180 A1 | 8/2015 | Boulanger-Lewandowski | 700/94 |
| 2015/0243325 A1 | 8/2015 | Pacurariu | 386/227 |
| 2015/0317655 A1 | 11/2015 | Myers | 705/7.34 |
| 2015/0348524 A1 | 12/2015 | Skillings | 84/603 |
| 2015/0355712 A1* | 12/2015 | Rihn | G06F 3/165 340/407.2 |
| 2015/0380014 A1 | 12/2015 | Le Magoarou | 704/258 |
| 2016/0062730 A1 | 3/2016 | Kwon | 715/716 |
| 2016/0157039 A1 | 6/2016 | Disch | 381/22 |
| 2016/0267914 A1 | 9/2016 | Hu | |
| 2017/0115956 A1 | 4/2017 | Zalon | |
| 2018/0005614 A1 | 2/2018 | Vilermo | |
| 2018/0083587 A1 | 3/2018 | Tammi | |
| 2019/0246204 A1* | 8/2019 | Bohrarper | G06F 16/639 |
| 2019/0261121 A1* | 8/2019 | Vilermo | G11B 27/031 |

FOREIGN PATENT DOCUMENTS

| | | |
|---|---|---|
| WO | WO 2011087460 A1 | 7/2011 |
| WO | WO-2013/010188 A1 | 1/2013 |
| WO | WO-2015/154159 A1 | 10/2015 |

OTHER PUBLICATIONS

Lund, Henrik Hautop, et al., "Remixing playware", 23$^{rd}$ IEEE International Symposium on Robot and Human Interactive Communication, http://ieeexplore.ieee.org/xpl/articleDetails.jsp?reload=true&arnumber=6926229>; Aug. 25-29, 2014, 2 pgs.

Sturmel, Nicolas, et al., "Linear Mixing Models for Active Listening of Music Productions in Realistic Studio Conditions", Audio Engineering Society, http://www.aes.org/e-lib/browse.cfm?elib=16232; Apr. 26, 2012, 1 pg.

"GarageBand for iPad", Apple Inc., http://help.apple.com/garageband/ipad/1.0.1/#chs3928318c; 2001, 6 pgs.

"MPEG Spatial Audio Object Coding (SAOC)", http://mpeg.chiariglione.org/standards/mpeg-d/spatial-audio-object-coding; Oct. 2016, 8 pgs.

"Upgrade Your Audio Experience", Dolby Atmos Audio Technology, http://www.dolby.com/us/en/brands/dolby-atmos.html; Oct. 2016; 4 pgs.

Richard, Scott, "The DUET blind Surce Separation Algorithm", 2007, 25 pgs.

Eronen, Antti, "Automatic Musical Instrument Recognition", Master of Science Thesis, Tampere University of Technology, Apr. 11, 2001, 74 pgs.

Falch, Cornelia et al., "Spatial Audio Object Coding With Enhanced Audio Object Separation", Proc. of the 13$^{th}$ Int. Conference on Digital Audio Effects (DAFx-10, Sep. 6-10, 2010.

Engdegard, Jonas, et al., "Spatial Audio Object Coding (SAOC)—The Upcoming MPEG Standard on Parametric Object Based Audio Coding", Audio Engineering Society Convention 124, Audio Engineering Society, 2008. 15 pgs.

Terentiev, Leonid, et al., "SAOC for Gaming—The Upcoming MPEG Standard on Parametric Object Based Audio Coding", Audio Engineering Society Conference, 35$^{th}$ International Conference: Audio for Games, Audio Engineering Society, 2009, 7 pgs.

(56) References Cited

OTHER PUBLICATIONS

Phon-Amnuaisuk Somnuk "*Handling a Dynamic Mixture of Sources in Blind Source Separation Tasks*". Proceedings of the 2013 Conference on Technologies and Applications of Artificial Intelligence (TAAI), Dec. 6-8, 2013, Taipei, Taiwan, Piscataway, NJ, USA: IEEE, Dec. 6, 2013, p. 211-216, ISBN 978-1-4799-2528-2, [retrieved on Jan. 25, 2018], <DOI: 10.1109/TAAI.2013.50>, XP 032584659 section III.

"*Blind Signal Separation*" Wikipedia article [online], Aug. 26, 2016, [retrieved on Jan. 25, 2018]. Retrieved from https://en.wikipedia.org/w/index.php?title=Blind_signal_separation&oldid=736311635 section "Approaches".

\* cited by examiner

METHOD OF EDITING AUDIO SIGNALS USING SEPARATED OBJECTS AND ASSOCIATED APPARATUS

CROSS REFERENCE TO RELATED APPLICATION

This patent application is a continuation application of copending U.S. patent application Ser. No. 15/283,681, filed on Oct. 3, 2016, the disclosure of which is incorporated by reference herein in its entirety.

BACKGROUND

Technical Field

The exemplary and non-limiting embodiments described herein relate generally to audio technologies and, more particularly, to methods of controlling separate audio objects in a mixed sound production and apparatuses for such methods.

Brief Description of Prior Developments

Various technologies allow end users to separate audio tracks or objects after formal productions of music or other audio has been mixed. Such technologies include DOLBY ATMOS, blind signal separation (BSS), and MPEG Spatial Audio Object Coding (SAOC). Music producers generally want to limit an end user's ability to apply these technologies in efforts to maintain the integrity of the originally-produced music.

SUMMARY

The following summary is merely intended to be exemplary. The summary is not intended to limit the scope of the claims.

In one exemplary aspect, a method comprises: providing an audio file comprising two or more discrete tracks; separating the two or more discrete tracks; setting a limit on an amount at least one of the two or more discrete tracks may be altered; and outputting the separated and limited discrete tracks as a file for use by an end user.

In accordance with another exemplary aspect, a method comprises: receiving an audio file comprising two or more discrete tracks; analyzing the two or more discrete tracks to determine a set limit on possible remixing for at least one of the two or more discrete tracks; editing at least one of the two or more discrete tracks; and remixing the two or more discrete tracks based on the determined set limit on possible remixing for the at least one of the two or more discrete tracks.

In accordance with another exemplary aspect, an apparatus comprises: at least one processor; and at least one non-transitory memory including computer program code configured to, with the at least one processor, cause the apparatus at least to: receive an audio file comprising two or more discrete tracks; separate the two or more discrete tracks from each other; analyze the two or more discrete tracks to determine a set limit on possible remixing for at least one of the two or more discrete tracks; and allow a user to remix the two or more discrete tracks based on the determined set limit on possible remixing for the at least one of the two or more discrete tracks.

BRIEF DESCRIPTION OF THE DRAWINGS

The foregoing aspects and other features are explained in the following description, taken in connection with the accompanying drawings, wherein.

DETAILED DESCRIPTION OF EMBODIMENT

Figure 1:
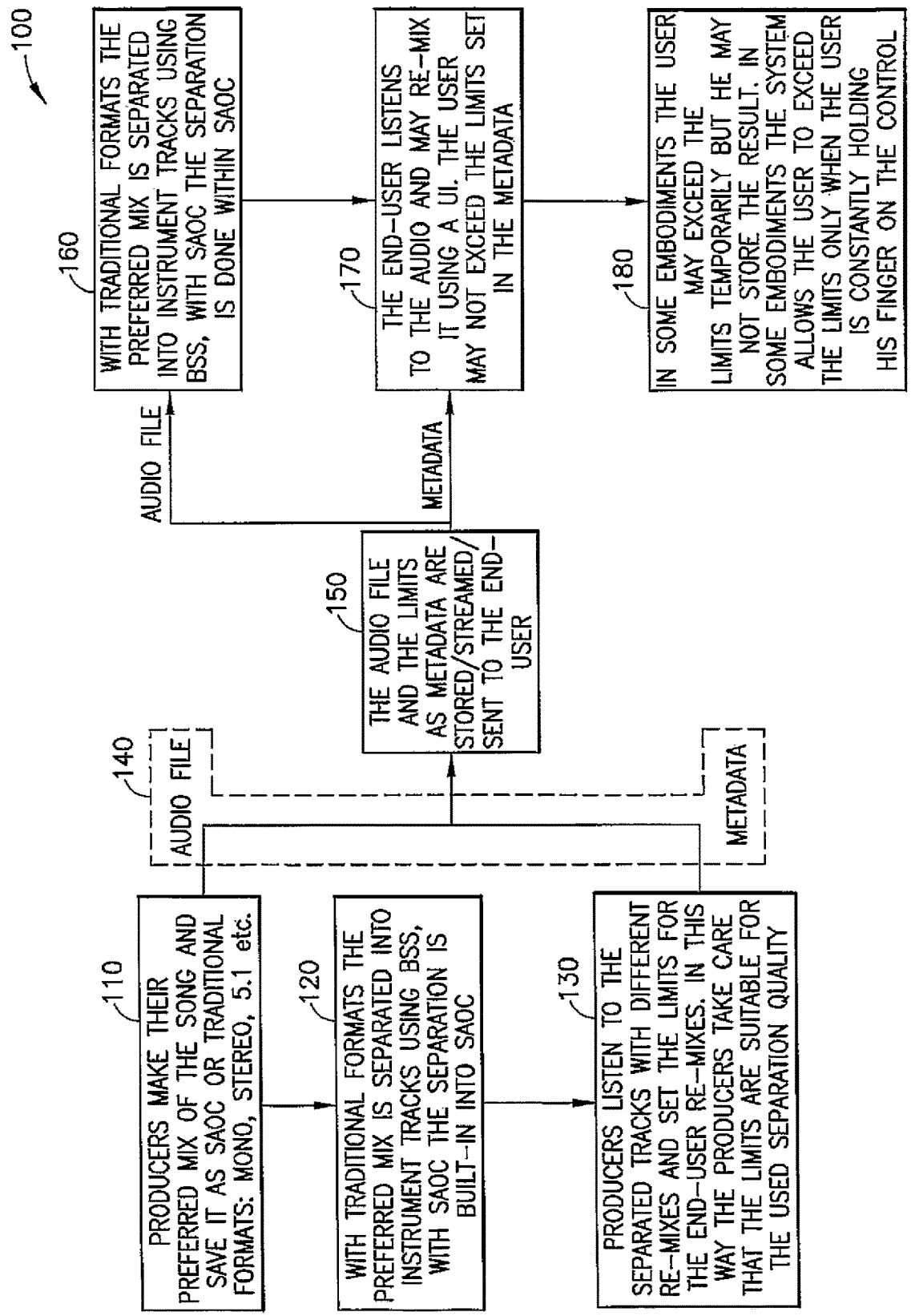
FIG. 1 is a flow diagram of one exemplary embodiment of a method of setting limits on an end user's ability to alter a final mix of music by a music producer.

Referring to the Figures, exemplary embodiments of methods of allowing an end user to alter, within defined limits, a mix of instrument and voice tracks are disclosed herein. Also disclosed herein are exemplary embodiments of apparatuses for carrying out such methods. Although some technologies (e.g., CD, MP3, and the like) do not allow the end user to alter a mix of tracks, more recent technologies do make such allowances. Such altering may be via the use of technology formats such as DOLBY ATMOS, blind signal separation (BSS), and MPEG Spatial Audio Object Coding (SAOC). For example, DOLBY ATMOS allows a completely free editing of instrument and voice tracks. BSS, however, provides a slightly less free editing ability due to little or no user-available information about the source signals or mixing processes used therefor. Editing using BSS may also result in products that suffer from separation artefacts. Similarly, in using MPEG SAOC, free editing is allowed, but audio quality may suffer due to changes in the object separation that are too drastic relative to the source track.

In any editing technology, music recordings may be recognized using any suitable method for the automatic identification of sound recordings. Some music files may be separated into instrument and voice tracks using any suitable algorithm (e.g., DUET BSS algorithm). Additionally, the instrument in each track may be recognized by any suitable automatic musical instrument recognition algorithm. A dominant instrument in a song can also be recognized by analyzing the music for a dominant tag.

In using any of the foregoing technologies to separate audio tracks, the end user may have a tendency to excessively modify music or other audio to their liking. For example, a guitar player may want to better hear the guitar track in a song in order to learn the notes or chords, a vocalist may want to understand lyrics, a person viewing a movie may want to hear the explosions louder or to filter out background noise in order to hear what a character is saying, or a person may want to simply hear only a voice track without hearing music, a laugh track, or other background sound in an effort to keep the overall volume at a minimum.

However, audio- or music producers generally do not want to allow end users complete control for one or more reasons. In particular, for reasons related to copyright, artists and producers want to limit the ability of an end user to completely single out instruments into separate tracks because such separated tracks may be used for unauthorized projects. Drastic changes to a song can also make that song sound bad, and when such versions of that song are widely disseminated (e.g., over the Internet), the original artist may incur negative reviews and/or bad publicity. Furthermore, it is well-noted that removing a laugh track from a comedy show often eliminates or reduces any comic effect.

Accordingly, both artists and producers generally dislike having their work products excessively modified by end users. To address issues of excessive modification of produced audio, music artists and music producers may desire to curtail the ability of an end user to modify a song (or other work product) by setting limits (either automatically or manually) regarding the extent to which the end user can remix audio files (for example, combine, pan, add reverberation, add autotuning ability, alter levels (e.g., levels of amplification relative to other levels), and the like). Such limits may include separating audio sources based on their location (e.g., direction of sound propagation) and playback of the separated audio sources. Other limits may be imposed by manipulation of playback options based on metadata associated with the audio. The exemplary embodiments disclosed herein are directed to imposing limits on the separation of instrument tracks (which is different from separation based on direction of sound propagation) as well as limiting the separation quality in playback.

The exemplary embodiments disclosed herein are directed to methods and tools for music producers to limit an end user's manipulation (using a user interface (UI)) of an audio mix of a song after instrument tracks have been separated. The manipulation may have either automatic limits or limits that can be set by the music producers. The exemplary embodiments described herein take into account the quality of the separation system when deciding the limits. In the alternative, a music producer can take into account the quality of the separated instrument tracks. Furthermore, the end user may be able to exceed the limits and listen to the result, but they may be prevented from saving or publishing (where license is given) remixes that exceed the limits. In addition, the exemplary embodiments disclosed herein may be used to enable inexperienced end users to remix their own recorded content with the help of BSS while limiting the risk of compromising the quality of the recorded content due to over remixing.

Referring to FIG. 1, one exemplary embodiment of a method of setting limits on the ability to alter a final mix is designated generally by the reference number 100 and is hereinafter referred to as "method 100." Method 100 is capable of working with traditional audio files, e.g., with a final mix by the producers only. In method 100, a producer manually sets the limits to which the end user may alter the final producer mix.

Method 100 is initiated with a music production step 110, a first separation step 120, and a limit setting step 130. In the music production step 110, a music producer uses discrete tracks of instruments and vocals (e.g., one instrument per track, one vocal per track, etc.) to make a preferred mix of a song. The music producer may then output and/or save the preferred mix in a particular format (e.g., mono, stereo, 5.1, or the like). The limits are stored as metadata alongside the actual song audio. In some embodiments, the song audio is stored in MPEG SAOC format, and the metadata is added to the free metadata field in the SAOC format. In some other embodiments, the song audio is stored in MPEG SAOC format and the metadata is added to an MP4 container. In some other embodiments, the song audio is stored as AAC (advanced audio coding), and the metadata is added to the free metadata field in the AAC format. With MPEG SAOC the tracks are stored within the format, and modifying the stored tracks is easy.

With AAC the tracks of the preferred mix may need to be separated into discrete tracks before modification, as indicated in the first separation step 120. An audio object separation system is used both in the music production end and at the user end. The separation system may need to be the same so that the metadata that the music producers decide on is applicable also at the user end. With some formats, the preferred mix may be separated into instrument tracks using BSS. If SAOC is used, however, the separation is built in. In any case, however, although the tracks are considered to be discrete, the separation thereof may not be perfect due to limitations in the production (e.g., particularly with regard to AAC and SAOC).

In the limit setting step 130, the music producer listens to the separated tracks with different remixes and determines allowed limits of user remixing. In this way, the music producer ensures that the determined limits are suitable for the used separation quality. Naturally, the producers can also consider aspects other than separation quality when deciding the limits. Such aspects may include artistic views and the like. The producers may also set limits such as, for example, "Vocal track cannot be attenuated" (so the limit may be zero, i.e., no alteration of the track is allowed), "Background singing track must always be at least 3 dB less than lead vocal track," and the like. In some exemplary embodiments, the limits may be determined using a computer program.

After the music production step 110, the first separation step 120, and/or the limit setting step 130, the separated/limited audio and metadata are outputted as an output file 140. In various exemplary embodiments, the output file 140 may be a finished production of an audio file by the music producer for the end user and may comprise instrument and/or vocal tracks.

If desired, the output file 140 may be encrypted so that only an approved version of a player program may decrypt it. In this way it can be made so that the end user cannot use other player programs to remix the songs excessively. In other words, a digital rights management (DRM) scheme may estimate the degree of change (as defined by the allowed limits for editing or remixing) before allowing saving, copying, or sharing of the content. The output file 140 is then stored, streamed, and/or sent to the player program in a sending step 150.

When the player program receives the output file 140 from the sending step 150, the player program checks for the existence of metadata and allows the end user to remix the song accordingly. As shown in a second separation step 160, the audio file of the preferred mix may be separated into instrument and/or voice tracks using BSS. If, on the other hand, the separation in the second separation step 160 is via SAOC, the separation is built in. In embodiments in which DOLBY ATMOS is used in the second separation step 160, at least some of the tracks may already be discrete because DOLBY ATMOS generally maintains the separation of tracks through the sending step 150. As shown in a remix step 170, the metadata is received, an analysis of the metadata is made to ascertain limits as to how much the end user may remix the tracks, and the end user listens to the audio and may remix it to the extent allowable using a UI. In doing so, the end user may not exceed the limits set in the metadata by the producers in the limit setting step 130.

In some embodiments, however, the end user may be permitted to exceed the set limits in a limit exceeding step 180. In the limit exceeding step 180, the end user may exceed the set limits temporarily, but the result may not be stored. In some other embodiments, the end user may be allowed to exceed the set limits only when the end user is constantly manipulating a control (e.g., holding a finger on a control button).

Figure 2:
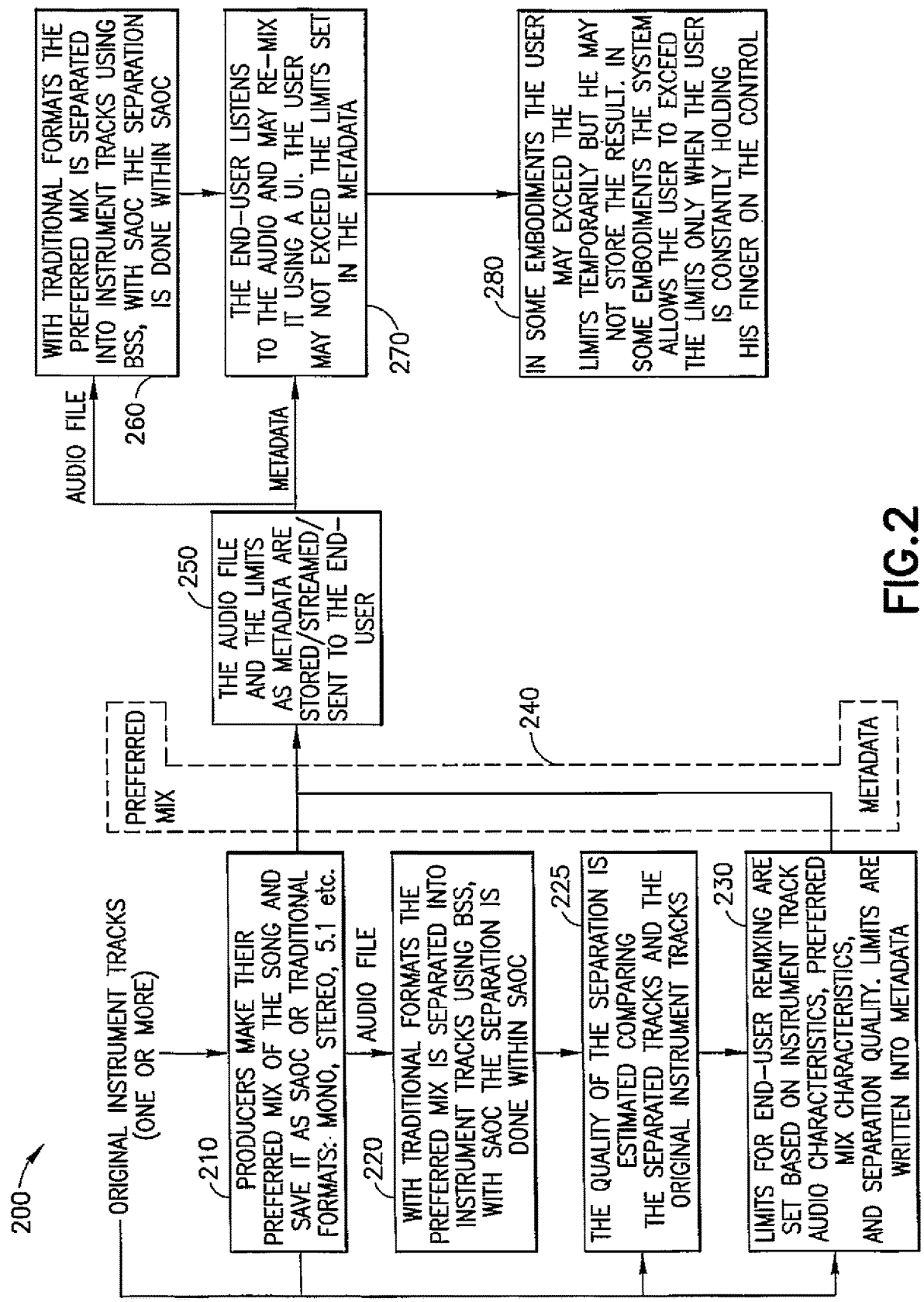
FIG. 2 is a flow diagram of another exemplary embodiment of a method of setting limits on an end user's ability to alter a final mix of music by a music producer.

Referring to FIG. 2, another exemplary embodiment of a method of setting limits on the ability to alter a final mix is designated generally by the reference number 200 and is hereinafter referred to as "method 200." In method 200, the original tracks are supplied in addition to final preferred mix by the producers. In the system of method 200, limits are automatically set with the assistance of the original track information.

Method 200 is initiated with a music production step 210, a first separation step 220, a quality estimation step 225, and a limit setting step 230. In the music production step 210, original instrument tracks are available from the music production. A music producer makes a preferred mix of a song and outputs and/or saves it in a particular format (e.g., mono, stereo, 5.1, or the like).

As shown in the first separation step 220, the preferred mix is separated into instrument tracks. The separated instrument tracks may be slightly different from the original instrument tracks because the separation may not be perfect. The separation can be done using BSS for traditional music files and SAOC for SAOC files.

In the quality estimation step 225, the quality of the separation is estimated using different criteria. In some embodiments only the file format is considered in the quality evaluation. SAOC files are considered to have high quality, whereas BSS files are considered to have lower quality. Different metrics of the files may also be calculated, for example, the system may calculate cross correlation between the original instrument tracks and the separated tracks. Higher correlation generally corresponds to higher quality.

In the limit setting step 230, limits may be set for how the end user can remix the files. Typically, higher quality files can be edited more, and lower quality files less. The limits may be written into metadata.

In addition to separation quality related limits, there may be other limits. The player program may analyze different characteristics of the tracks of the song. The analysis may include recognizing instruments using automatic instrument recognition algorithms, recognizing the dominant instrument of the song, recognizing the tempo of the song, recognizing frequency- or time-domain characteristics such as impulses, zero-crossing rate, spectral tilt, overall spectrum, transient or sinusoidal nature of the song, and the like. The analysis can be performed for the whole song or only for parts of the song. The end user may remix the song using a UI. The player program software sets limits for end user remixing based on the analysis. The limits may be, for example, "The dominant instrument cannot be attenuated," "Vocal tracks cannot be attenuated," "Songs with tempo >180 bpm cannot be sped up," and the like. Also, limits can be used in combination with music analysis (e.g., "The dominant instrument cannot be attenuated more than 2 dB,"

"Vocal tracks cannot be attenuated," and the like). These limits may also be written into the metadata.

The separated/estimated/limited audio and metadata are then outputted as an output file 240 as instrument tracks. The output file 240 is then stored, streamed, and/or sent to the end user in a sending step 250.

When the player program receives the output file 240 from the sending step 250, the player program receives a music song file with metadata that describes the limits for editing. The player program separates the song into audio object tracks in a second separation step 260. In the second separation step 260, the audio file may be separated using BSS or SAOC (with the separation built in).

As shown in a remix step 270, the end user may remix the song using a UI. The end user may not remix the song so that the remix would exceed the limits set in the metadata. The limits may be, for example, "An instrument may be set louder or quieter but not more than described in the metadata." For each track the metadata may contain limits, e.g., in Decibels. Such limits may be, for example, "The level of Track 3 can by modified by the user from −3 dB to +3 dB" if the separation quality is low, and "The level of Track 3 can by modified by the user from −12 dB to +12 dB" if the separation quality is high.

In some embodiments of method 200 (as with method 100), the end user may exceed the set limits in a limit exceeding step 280. In the limit exceeding step 280, the end user may exceed the set limits temporarily, but the result may not be stored. In some other embodiments, the end user may be allowed to exceed the set limits only when the end user is constantly manipulating a control (e.g., holding a finger on a control button).

Figure 3:
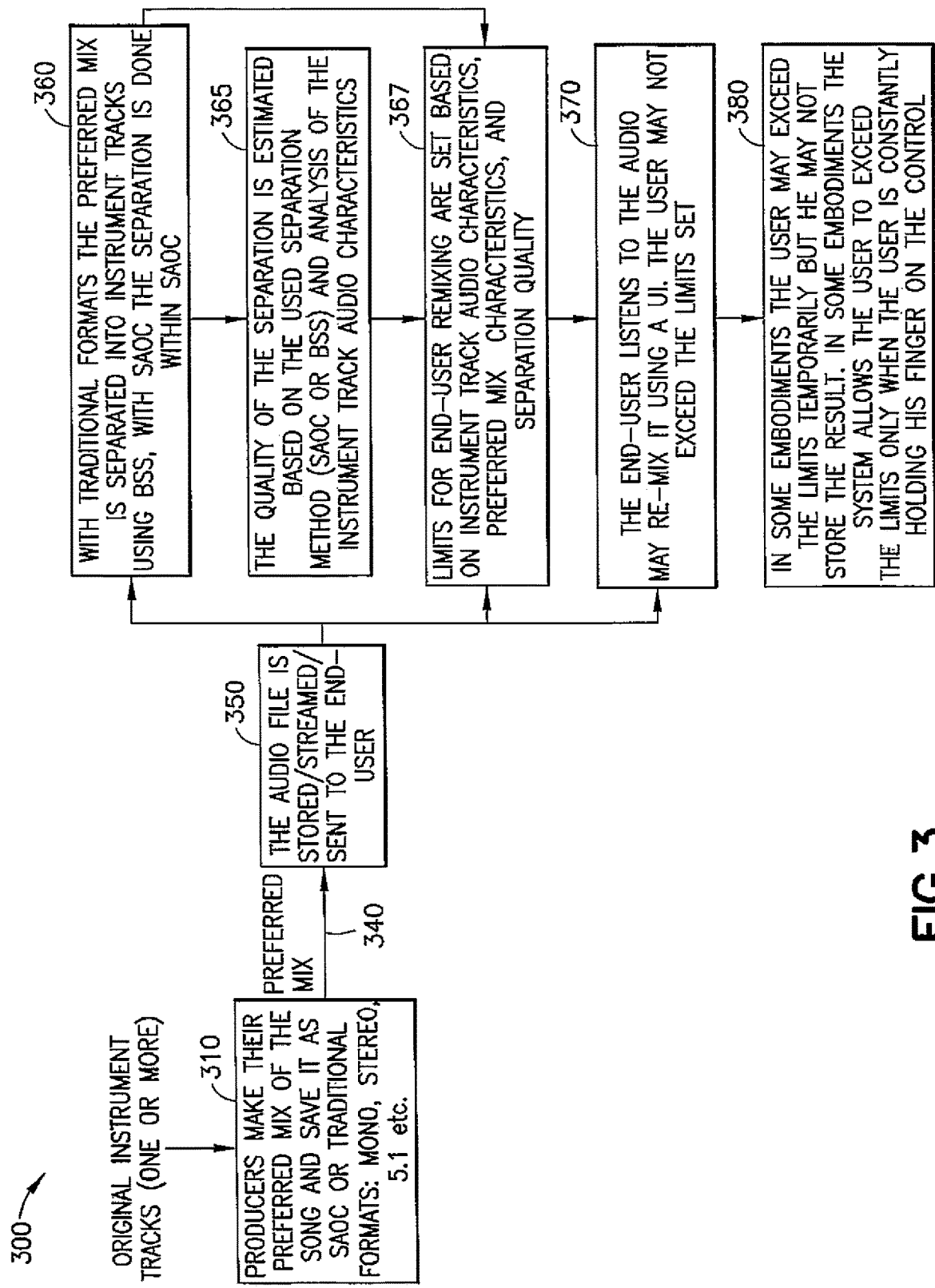
FIG. 3 is a flow diagram of another exemplary embodiment of a method of automatically setting limits on an end user's ability to alter a final mix of music by a music producer.

Referring to FIG. 3, another exemplary embodiment of a method of automatically setting limits without information pertaining to the original instrument tracks is designated generally by the reference number 300 and is hereinafter referred to as "method 300." Method 300 operates with traditional audio files, e.g., with the final mix by the producers only.

Method 300 comprises a music production step 310 in which one or more original instrument tracks are available from the music production. A music producer makes preferred mix of a song and outputs and/or saves it in a particular format (e.g., mono, stereo, 5.1, or the like). After the music production step 310, the preferred mix is outputted as an output file 340 of instrument tracks and stored, streamed, and/or sent to the end user in a sending step 350.

In a separation step 360, a player program receives a music song file with no metadata. The player program separates the preferred mix into instrument tracks. The separation can be done using BSS for traditional music files and SAOC for SAOC files.

Quality of the separation may then be estimated in an end user quality estimation step 365. The end user quality estimation step 365 may employ different criteria. In some embodiments only the file format is considered in the quality evaluation. SAOC files are considered to have high quality, whereas BSS files are considered to have lower quality. Different metrics of the files may also be calculated, for example, the system may calculate cross correlation between the separated tracks. If the tracks have low correlation, then the separation may be considered to have a high success rating. However, if the tracks have high correlation, then the separation may be considered to have a lower success rating.

As shown in a limit setting step 367, limits are set with regard to how the end user may remix the files. In such a step, higher quality files can be edited more, and lower quality files can be edited less. Such limits may be, for example, "The level of Track 3 can by modified by the user from −3 dB to +3 dB" if the separation quality is low, and "The level of Track 3 can by modified by the user from −12 dB to +12 dB" if the separation quality is high.

In addition to separation quality related limits there may be other limits. For example, the player program may analyze different characteristics of the tracks of the song. The analysis may include recognizing instruments using automatic instrument recognition algorithms, recognizing the dominant instrument of the song, recognizing the tempo of the song, recognizing frequency- or time-domain characteristics such as impulses, zero-crossing rate, spectral tilt, overall spectrum, transient or sinusoidal nature of the song, and the like. The analysis can be performed for the whole song or only for parts of the song. The user may remix the song using a UI. The player program software sets limits for user remixing based on the analysis. The limits may be, for example, "The dominant instrument cannot be attenuated," "Vocal tracks cannot be attenuated," "Songs with tempo >180 bpm cannot be sped up," and the like. Also, limits can be used in combination with music analysis (e.g., "The dominant instrument cannot be attenuated more than 2 dB," "Vocal tracks cannot be attenuated," and the like).

As shown in a remix step 370, the end user may remix the song using a UI. The end user may not remix the song so that the remix would exceed the limits set.

The end user may exceed the set limits in a limit exceeding step 380. In the limit exceeding step 380, the end user may exceed the set limits temporarily, but the result may not be stored. In some other embodiments, the end user may be allowed to exceed the set limits only when the end user is constantly manipulating a control (e.g., holding a finger on a control button).

Figure 4:
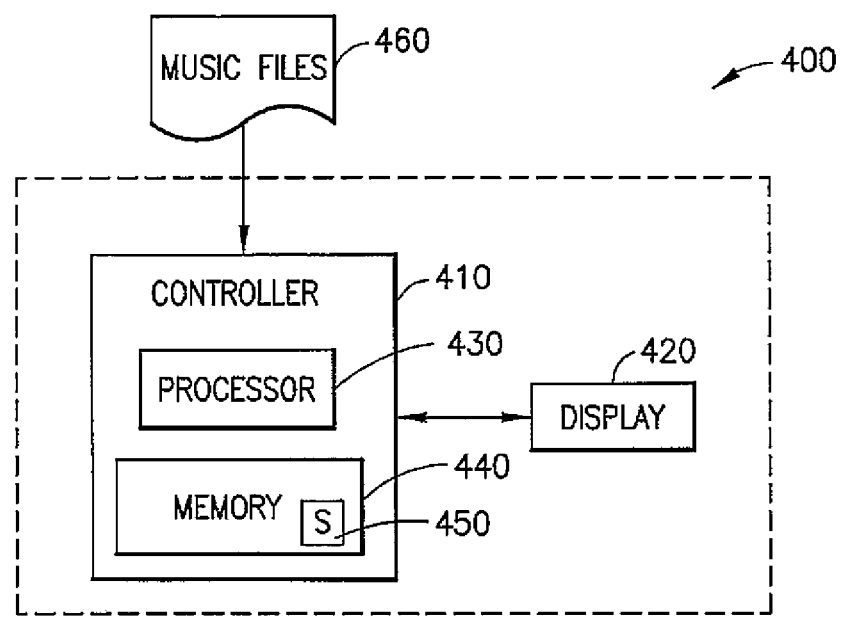
FIG. 4 is a block diagram of a user interface receiving music files.

Referring to FIG. 4, the instrument tracks from any of the foregoing exemplary embodiments may be received into an apparatus or electronic device for use by the end-user. The apparatus or electronic device may be a user interface (UI) designated by the reference number 400 and hereinafter referred to as "UI 400." UI 400 comprises a controller 410 and a display 420. The controller 410 may include a processor 430 and a memory 440, with software 450 being located in the memory 440. The instrument tracks may be music files 460.

Figure 5:
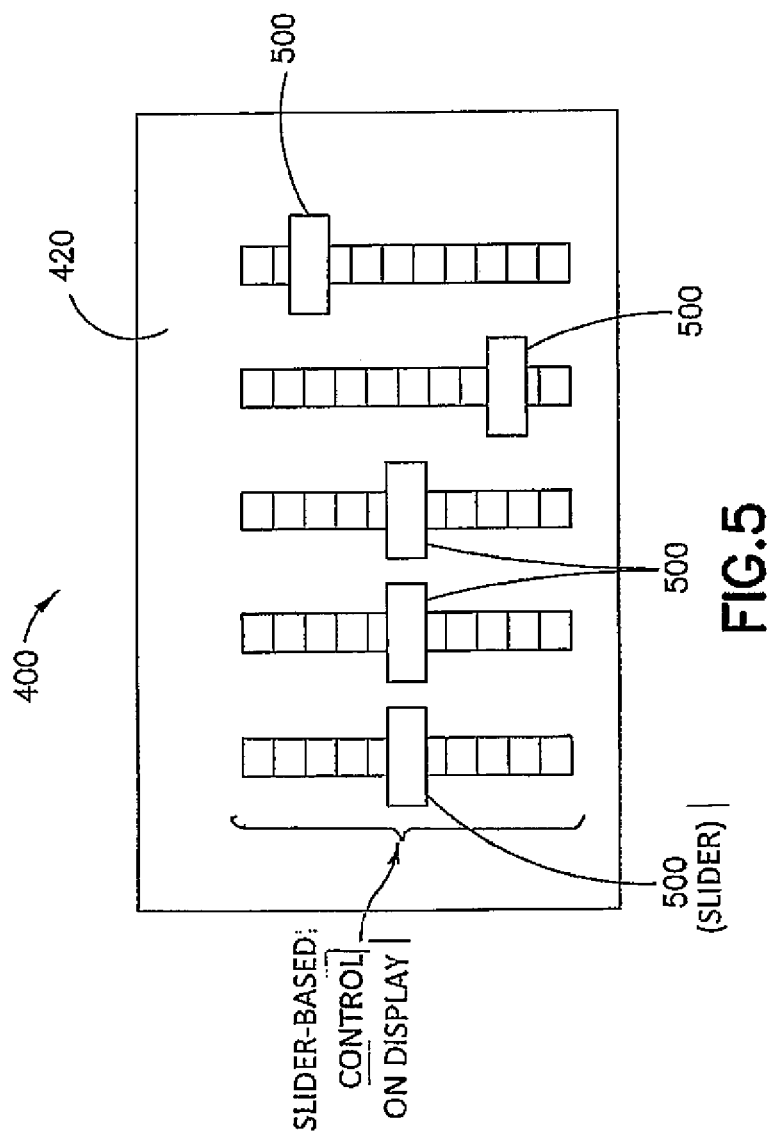
FIG. 5 is a schematic diagram of a user interface having slider-based controls on a display thereof.

Referring to FIG. 5, the UI 400 may comprise a simple slider-based control on the display 420 where each slider 500 represents a track in a song. The end user may change each track by manipulating its corresponding slider 500.

Figure 6:
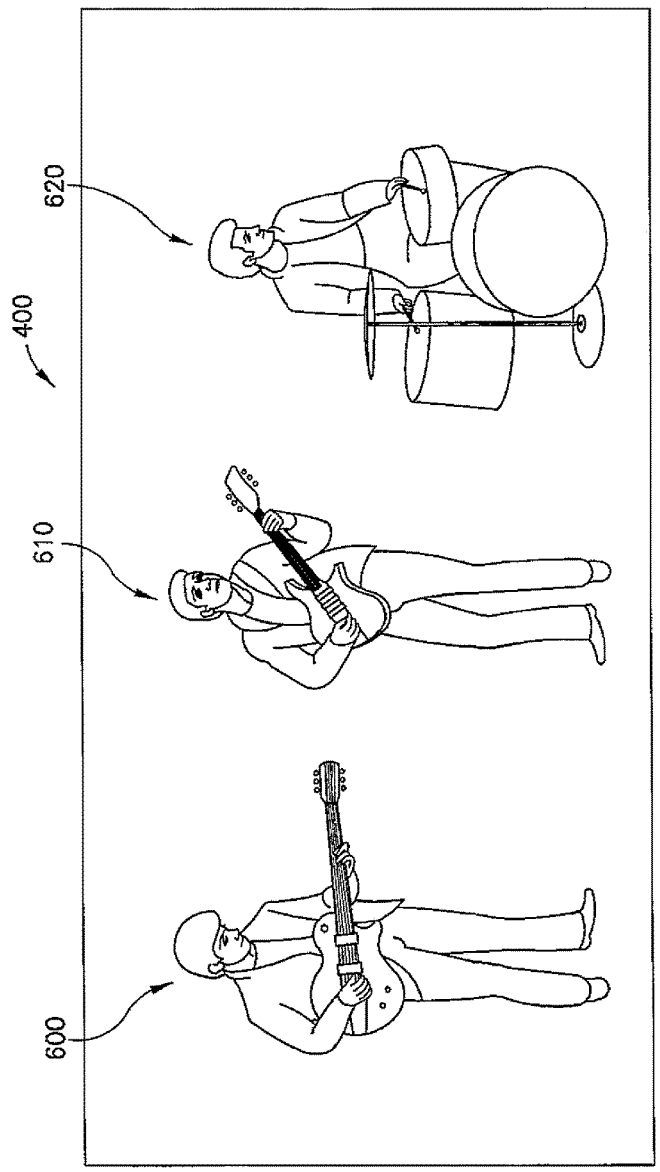
FIG. 6 is a schematic diagram of a user interface showing displays of manipulable images of the artists of a band.

Referring to FIG. 6, the UI 400 may be a graphical user interface (GUI) that displays images 600, 610, 620 of the artists of a band and allows the end user to manipulate the images 600, 610, 620 so as to simultaneously manipulate the audio mix of the artists. The GUI may render use of the UI 400 more intuitive as compared to a UI incorporating a slider. The images 600, 610, 620 may be, for example, album cover art. Each image 600, 610, 620 may have different colors or visual effect to indicate whether the instrument associated with the image can or cannot be edited.

Figure 7:
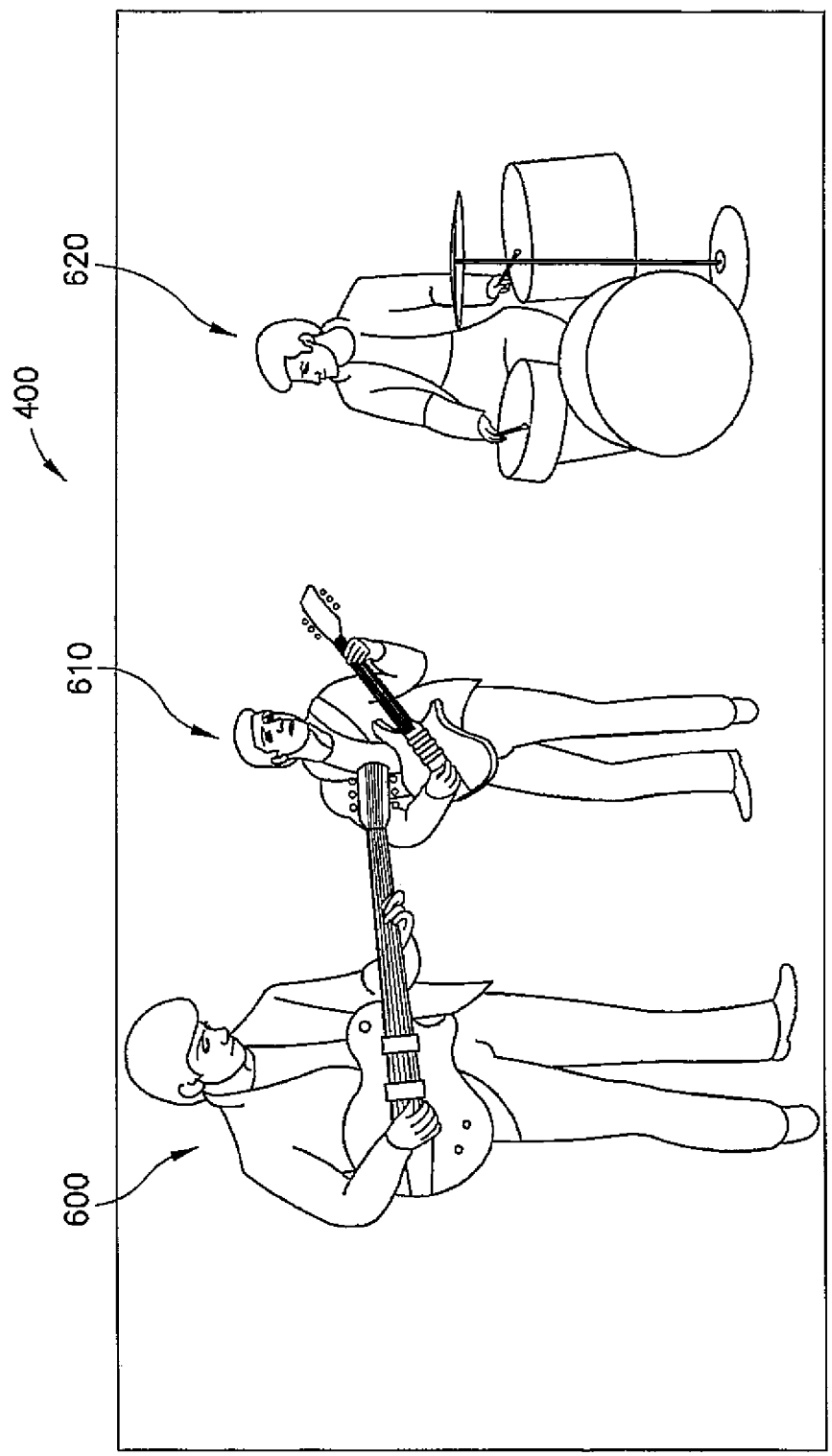
FIG. 7 is a schematic diagram of the user interface of FIG. 6 showing one of the manipulable images being enlarged.
Figure 8:
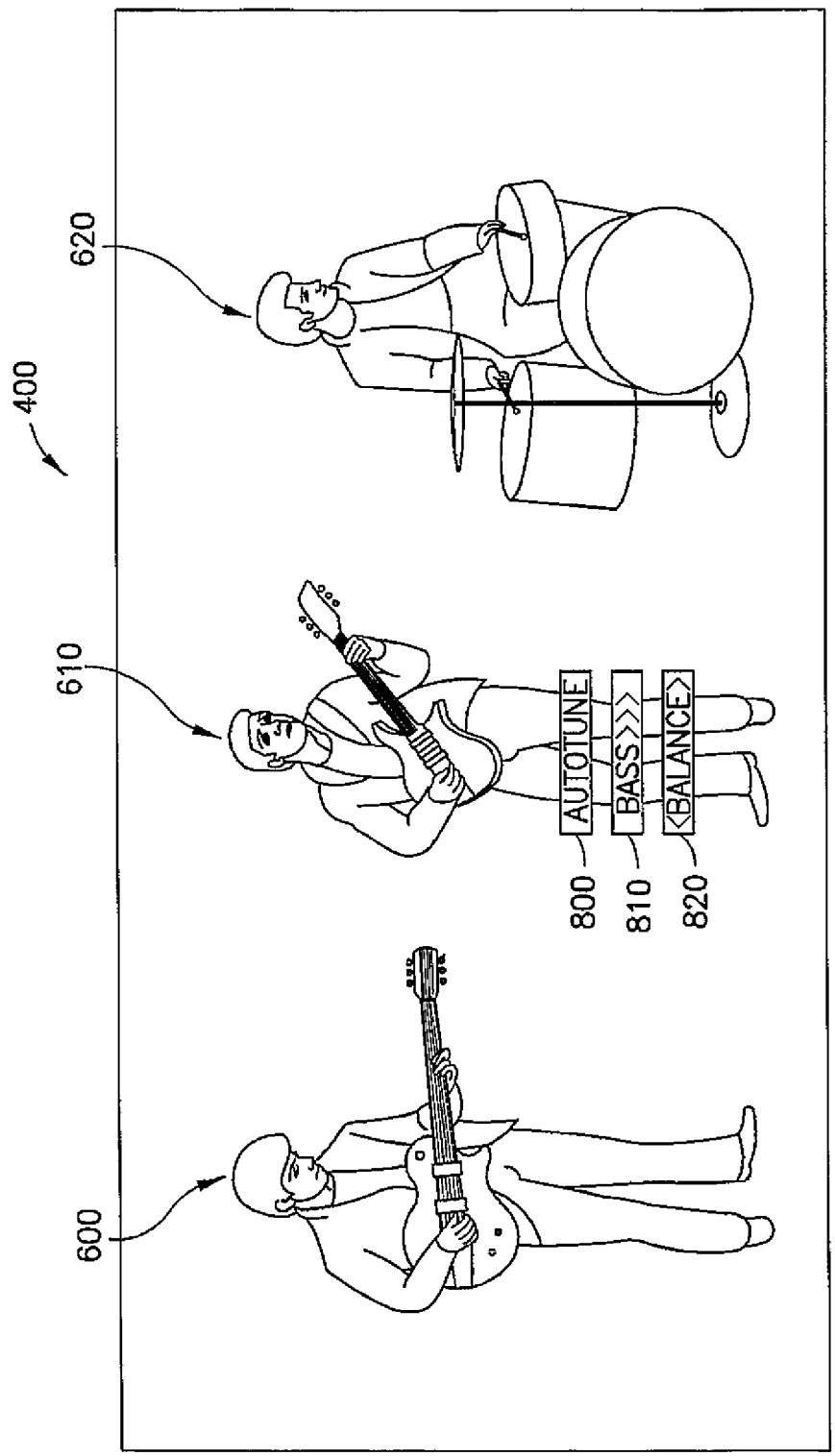
FIG. 8 is a schematic diagram of the user interface of FIG. 6 showing visual objects associated with one of the manipulable images.

Particularly in embodiments in which the UI 400 is graphical, the music files 460 may include visual files where visual objects of the visual files have been mapped to instruments and/or voices, i.e., music objects in the music files 460. The end user may then manipulate the visual objects and at the same time automatically manipulate the music objects. Manipulation of the music objects includes, but is not limited to, selecting a band member visual object to increase their track volume, and the like. As shown in FIG. 7, an image 600 of a band member, as a visual object, may be pinched bigger to increase their track volume. Manipulation may also include moving a band member visual object to move the auditory spatial position of their track, e.g., moving the band member's associated track from a left speaker to a right speaker and vice versa. As shown in FIG. 8, audio effects like autotune 800, bass/treble 810, balance between speakers 820, reverb, equalization, etc. may appear as visual objects. The end user may then control the amount of these effects by manipulating the visual object. Each track may have its own effects.

Figure 9:
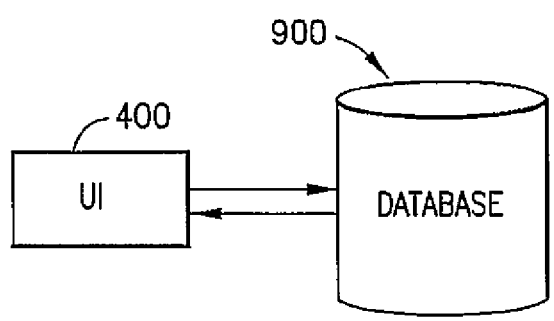
FIG. 9 is a block diagram of a user interface in communication with a database.

Referring to FIG. 9, the UI 400 may use any suitable method for recognizing a song in a music file. For example, the UI 400 may access an online (or other) database 900, which the UI 400 may use to search for the artists recorded in the music file. The UI 400 may further search online images of the artists and/or their instruments. The UI 400 may further divide the music file into instrument/voice tracks (using, for example, the DUET BSS algorithm) and may also recognize the instrument in each track (using, for example, any suitable automatic musical instrument recognition algorithm). The UI 400 may map each track to an artist based on the knowledge of the artist's instrument. Images of the artists or their instruments may be displayed, and the end user may manipulate individual tracks based on such. Furthermore, if there are several players with the same instrument, the UI 400 may sum those tracks together instead of an artist image showing an instrument image or a group or composite image of the artists.

Other aspects of the UI 400 may include displaying different pictures on the display 420 at different parts of songs when players change or are silent. Additionally, a record label associated with the song may provide several example mixes with associated pictures where band member visual objects match the mix. Such a system may automatically choose an end user-preferred mix based on either user settings or the end user's previous habits. For example, if the end user always mixes the bass player louder, a mix may be selected where the bass player is loudest of all the players. The end user may be supplied with a visual confirmation of the mix because the system shows him or her an image where the bass player visual object is larger than others.

Remixing by the end user on the UI 400 may also be channel-based so that the end user amplifies/attenuates an instrument differently in different channels in multichannel audio. In this way, the end user may control the perceived spatial location of the instrument. The differing amount of amplification may also be limited in metadata or by automatic analysis, e.g., higher quality files associated with the spatial location can be changed more than lower quality files.

In any embodiment of the UI 400, the end user may exceed the limits set by the music producers. In the UI 400, this may be visible, for example, on a touch display device so that the control moves slower after the limit has been exceeded and the end user has to swipe many times to move the control. The control may be a slider as shown in FIG. 5 or an icon. The end user may listen to the song with limits that exceed the remixing, but the remixed version may be refused saving and/or transmitting by the UI 400.

In embodiments of the UI 400 in which the end user may exceed the limits set by the producers, the exceeded limits may be noted on the display 420 by being made visible, for example, on a touch display device so that the remix exceeds limits only if the user holds his finger on the slider and keeps it above the slider maximum value. When the user releases his finger the slider returns to the maximum value.

In addition to using the exemplary embodiments described herein for music files, the embodiments described herein are applicable for audio broadcasts, teleconferencing, movie audio, audio books, and the like. The exemplary embodiments described herein may also be used with an end user's own recorded content because allowing end users to remix their own content is a beneficial feature (but traditional remix with BSS may require some expertise, which may cause the end-result to sound less than desirable, thereby possibly causing end users to stop using it). However, with the exemplary embodiments described herein, BSS can be used by inexperienced end users with less of a risk of them detracting from the overall quality of their own content.

With regard to the embodiments described herein: limits for remixing may be set individually for each instrument; artists can set instrument-wise limits even if audio is sent using backwards-compatible audio formats such as AAC or MP3 using audio object separation and metadata; in some embodiments the limits for remixing may be set automatically; in some embodiments automatic instrument-wise limits may be used even without metadata; and an intuitive way for end users to create personal music mixes is realized.

Referring now to all of the Figures described herein, any of the foregoing exemplary embodiments may be implemented in software, hardware, application logic, or a combination of software, hardware, and application logic. The software, application logic, and/or hardware may reside in the UI 400 to remix audio. If desired, all or part of the software, application logic, and/or hardware may reside at any other suitable location. In an example embodiment, the application logic, software, or an instruction set is maintained on any one of various computer-readable media. A "computer-readable medium" may be any media or means that can contain, store, communicate, propagate, or transport instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

In one exemplary embodiment, a method comprises: providing an audio file comprising two or more discrete tracks; separating the two or more discrete tracks; setting a limit on an amount at least one of the two or more discrete tracks may be altered; and outputting the separated and limited discrete tracks as a file for use by an end user.

In the method, setting a limit on an amount each of the two more discrete tracks may be altered may comprise storing a limit as metadata. Storing a limit as metadata may comprise manually setting the limit in the metadata. Manually setting the limit in the metadata may comprise manually determining upper and lower limits of acceptable sound. Storing a limit as metadata may comprise automatically setting the limit in the metadata based on a configuration of the two or more discrete tracks in the audio file. Automatically setting the limit in the metadata may comprise determining a sound quality based on a correlation between the two or more discrete tracks of the audio file and the two or more discrete tracks after separation. The method may further comprise encrypting the outputted file. Storing a limit as metadata may comprise storing audio in a spatial audio object coding format. Storing a limit as metadata may comprise storing audio in a spatial audio object coding format and storing the metadata in an MP4 container.

In another exemplary embodiment, a method comprises: receiving an audio file comprising two or more discrete tracks; analyzing the two or more discrete tracks to determine a set limit on possible remixing for at least one of the two or more discrete tracks; editing at least one of the two or more discrete tracks; and remixing the two or more discrete tracks based on the determined set limit on possible remixing for the at least one of the two or more discrete tracks.

The method may further comprise separating the two or more discrete tracks from each other before analyzing. Separating the two or more discrete tracks from each other may be based on a blind signal separation format or a spatial audio object coding format. The method may further comprise exceeding the determined set limit on possible remixing. The received audio file may include no metadata. Analyzing the two or more discrete tracks may comprise calculating a correlation between the two or more separated discrete tracks and setting a limit on an extent of possible remixing based on the calculated correlation.

In another exemplary embodiment, an apparatus comprises: at least one processor; and at least one non-transitory memory including computer program code configured to, with the at least one processor, cause the apparatus at least to: receive an audio file comprising two or more discrete tracks; separate the two or more discrete tracks from each other; analyze the two or more discrete tracks to determine a set limit on possible remixing for at least one of the two or more discrete tracks; and allow a user to remix the two or more discrete tracks based on the determined set limit on possible remixing for the at least one of the two or more discrete tracks.

The apparatus may be further caused to separate the two or more discrete tracks from each other based on a blind signal separation format. The apparatus may be further caused to separate the two or more discrete tracks from each other based on a spatial audio object coding format. The apparatus may be further caused to allow the user to exceed the determined set limit on possible remixing. Analyzing the two or more discrete tracks may comprise further causing the apparatus to calculate a correlation between the two or more separated discrete tracks and to set a limit on an extent of possible remixing based on the calculated correlation.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications, and variances which fall within the scope of the appended claims.

What is claimed is:

1. A method, comprising:
providing an audio file comprising two or more discrete tracks;
separating the two or more discrete tracks;
determining a limit on an ability to alter an amount of an effect, using a visual object, wherein the visual object is configured to be presented on a display so as to be manipulated, based on at least one of the two or more discrete tracks;
altering the amount of the effect;

determining if the limit on the ability to alter the amount of the effect is exceeded;

if the limit on the ability to alter the amount of the effect is exceeded, preventing the effect from being one or more of saved, copied, and published; and outputting the separated discrete tracks for altering the amount of the effect.

2. The method of claim 1, wherein determining the limit on the ability to alter the amount of the effect comprises analyzing metadata associated with the audio file.

3. The method of claim 1, wherein altering the amount of the effect comprises applying a constant manipulation of a control.

4. The method of claim 1, wherein if the limit on the ability to alter the amount of the effect is not exceeded, further comprising authorizing one or more of saving, copying, and publishing the effect.

5. The method of claim 4, further comprising, outputting the separated and limited discrete tracks as a file; and encrypting the outputted file.

6. The method of claim 1, wherein the limit on the ability to alter the amount of the effect is determined based on an estimated quality of a file format of the audio file.

7. The method of claim 6, wherein the estimated quality of the file format is determined from a computer program analysis.

8. The method of claim 6, wherein the estimated quality of the file format is based on a determination from a user or a creator of the audio file.

9. A method, comprising:

receiving an audio file comprising two or more discrete tracks;

analyzing the two or more discrete tracks to determine a limit on an ability to alter an amount of an effect, using a visual object based on manipulating an image on a display, based on at least one of the two or more discrete tracks;

altering the amount of the effect;

determining if the limit on the ability to alter the amount of the effect is exceeded;

if the limit on the ability to alter the amount of the effect is exceeded, preventing the effect from being one or more of saved, copied, and published; and remixing the two or more discrete tracks.

10. The method of claim 9, further comprising separating the two or more discrete tracks from each other before analyzing.

11. The method of claim 10, wherein separating the two or more discrete tracks from each other is based on a blind signal separation format or a spatial audio object coding format.

12. The method of claim 9, wherein altering the amount of the effect comprises applying a constant manipulation of a control.

13. The method of claim 9, wherein the limit on the ability to alter the amount of the effect is determined based on an estimated quality of a format of the audio file.

14. An apparatus, comprising:

at least one processor; and at least one non-transitory memory including computer program code configured to, with the at least one processor, cause the apparatus at least to:

receive an audio file comprising two or more discrete tracks;

analyze the two or more discrete tracks to determine a limit on an ability to alter an amount of an effect, using a visual object based on manipulating an image on a display, based on at least one of the two or more discrete tracks;

alter the amount of the effect;

determine if the limit for altering the amount of the effect for the at least one of the two or more discrete tracks is exceeded;

if the limit on the ability to alter the amount of the effect is exceeded, prevent the effect from being one or more of saved, copied, and published; and allow a remix of the two or more discrete tracks.

15. The apparatus of claim 14, wherein the apparatus is further caused to separate the two or more discrete tracks from each other based on a blind signal separation format.

16. The apparatus of claim 14, wherein the apparatus is further caused to separate the two or more discrete tracks from each other based on a spatial audio object coding format.

17. The apparatus of claim 14, wherein the apparatus is further caused to output the remix of the two or more discrete tracks.

18. The apparatus of claim 14, wherein if the limit on the ability to alter the amount of the effect is determined to be not exceeded, an authorization is provided for one or more of saving, copying, and publishing the effect.

* * * * *